United States Patent
Nakajima

(10) Patent No.: US 11,542,455 B2
(45) Date of Patent: Jan. 3, 2023

(54) LUBRICATING OIL COMPOSITION AND COMPOSITION FOR REFRIGERATOR

(71) Applicant: IDEMITSU KOSAN CO., LTD., Chiyoda-ku (JP)

(72) Inventor: So Nakajima, Edogawa-ku (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 16/632,663

(22) PCT Filed: Jan. 8, 2019

(86) PCT No.: PCT/JP2019/000160
§ 371 (c)(1),
(2) Date: Jan. 21, 2020

(87) PCT Pub. No.: WO2019/146395
PCT Pub. Date: Aug. 1, 2019

(65) Prior Publication Data
US 2021/0130729 A1  May 6, 2021

(30) Foreign Application Priority Data
Jan. 24, 2018  (JP) .............................. JP2018-009708

(51) Int. Cl.
| C10M 169/04 | (2006.01) |
| C09K 5/04 | (2006.01) |
| C10M 107/24 | (2006.01) |
| C10M 107/34 | (2006.01) |
| C10M 137/02 | (2006.01) |
| C10M 137/04 | (2006.01) |
| C10M 137/12 | (2006.01) |
| C10N 30/00 | (2006.01) |
| C10N 40/30 | (2006.01) |

(52) U.S. Cl.
CPC ........... *C10M 169/04* (2013.01); *C09K 5/045* (2013.01); *C10M 107/24* (2013.01); *C10M 107/34* (2013.01); *C10M 137/02* (2013.01); *C10M 137/04* (2013.01); *C10M 137/12* (2013.01); *C09K 2205/106* (2013.01); *C09K 2205/12* (2013.01); *C09K 2205/122* (2013.01); *C09K 2205/126* (2013.01); *C09K 2205/132* (2013.01); *C10M 2209/043* (2013.01); *C10M 2209/1033* (2013.01); *C10M 2223/041* (2013.01); *C10M 2223/049* (2013.01); *C10M 2223/06* (2013.01); *C10N 2030/42* (2020.05); *C10N 2040/30* (2013.01)

(58) Field of Classification Search
CPC .............. C10M 137/02; C10M 137/12; C10M 105/38; C10M 107/24; C10M 107/34; C10M 137/04; C10M 101/02; C10M 169/04; C10M 2223/041; C10M 2223/049; C10M 2223/06; C10M 2209/1033; C10M 2209/043; C09K 5/04; C09K 5/045; C09K 2205/132; C09K 2205/126; C09K 2205/12; C09K 2205/106; C09K 2205/122; C10N 2030/42; C10N 2040/30
See application file for complete search history.

(56) References Cited

U.S. PATENT DOCUMENTS

| 3,271,313 | A | | 9/1966 | Boisselle |
| 3,986,965 | A | | 10/1976 | Clark et al. |
| 4,011,267 | A | | 3/1977 | Tamborski et al. |
| 4,043,926 | A | | 8/1977 | Snyder, Jr. et al. |
| 4,097,388 | A | | 6/1978 | Snyder, Jr. et al. |
| 4,384,966 | A | | 5/1983 | Dingwall et al. |
| 4,438,006 | A | | 3/1984 | Snyder et al. |
| 4,835,202 | A | | 5/1989 | Pastor et al. |
| 5,547,593 | A | * | 8/1996 | Sanechika ............ C10M 105/06 508/207 |
| 5,595,962 | A | | 1/1997 | Caporiccio et al. |
| 6,329,327 | B1 | * | 12/2001 | Tanaka .................. C10M 125/10 508/362 |
| 2017/0198236 | A1 | * | 7/2017 | Hiyoshi ................. C09K 5/045 |

FOREIGN PATENT DOCUMENTS

| CN | 104277887 | | 1/2015 |
| EP | 0 389 967 | A2 | 10/1990 |
| JP | S48-10305 | | 4/1973 |
| JP | 52-78854 | | 7/1977 |
| JP | 56-150076 | A | 11/1981 |
| JP | 2-298589 | A | 12/1990 |
| JP | 5-9490 | A | 1/1993 |
| JP | 8-157856 | A | 6/1996 |
| JP | 11-100586 | A | 4/1999 |

(Continued)

OTHER PUBLICATIONS

Extended European Search Report dated Aug. 25, 2021 in European Patent Application No. 19744317.9, 6 pages.
International Search Report dated Feb. 12, 2019 in PCT/JP2019/000160 filed on Jan. 8, 2019, 2 pages.
Japanese Office Action dated Nov. 9, 2021 in Japanese Patent Application No. 2018-005708 (with unedited computer generated English translation), 11 pages.
Office Action dated Apr. 12, 2022, in JP Application No. 2018-009708, w/ English translation—5 pages.
Office Action dated Jan. 27, 2022, in CN Application No. 201980003699.8—12 pages.
Donald H. Buckley, "Interaction of Some Extreme-Pressure Type Lubricating Compounds With an Iron Surface", NASA Technical Note NASA TN D-7528, pp. 1-15, Dec. 1973.

*Primary Examiner* — Vishal V Vasisth
(74) *Attorney, Agent, or Firm* — Oblon, McClelland, Maier & Neustadt, L.L.P.

(57) ABSTRACT

A lubricating oil composition excellent in the wear resistance and a refrigerator oil composition excellent in the oxidation stability using the lubricating oil composition are provided by a lubricating oil composition containing a base oil (A) and a phosphine derivative (B) having one or more oxygen atom in a molecule.

8 Claims, No Drawings

(56) References Cited

FOREIGN PATENT DOCUMENTS

| | | |
|---|---|---|
| JP | 2003-119483 | 4/2003 |
| WO | WO2015/026566 | 2/2015 |

* cited by examiner

LUBRICATING OIL COMPOSITION AND COMPOSITION FOR REFRIGERATOR

This application is a 371 of PCT/JP2019/000160 filed Jan. 8, 2019.

TECHNICAL FIELD

The present invention relates to a lubricating oil composition and a refrigerator oil composition.

BACKGROUND ART

In association with the increase in speed, the increase in pressure, and the reduction in size of industrial machines in recent years, hydraulic machines, compression machines, turbines, gear elements, and machine elements, such as bearings, are being operated under severer conditions, and a lubricating oil used for the machines is demanded to have such a lubrication capability that sufficiently secures the lifetime of the machine for a prolonged period of time even under the severe conditions.

For the purpose of the enhancement of the lubrication capability of the lubricating oil, various additives are blended with the lubricating oil. Among these, tricresyl phosphate (which may be hereinafter referred to as "TCP") has been used as an additive for enhancing the wear resistance.

For example, PTL 1 describes a reinforcing agent for a lubricating oil that is characterized by blending the prescribed amount of tricresyl phosphate as a phosphorus based extreme pressure agent with a base oil formed of a mineral oil, a synthetic oil, or a mixed oil thereof.

CITATION LIST

Patent Literature

PTL 1: JP 11-100586 A

SUMMARY OF INVENTION

Technical Problem

However, there is an increasing demand of the enhancement effect of the wear resistance to the lubricating oil, and an additive that is capable of enhancing the wear resistance more than TCP is demanded.

Furthermore, the present inventors have found that in the case where a lubricating oil composition containing TCP is used as a refrigerator oil, there is a problem that the acid value of the lubricating oil composition is increased under a high temperature. The problem becomes conspicuous in the case where an unsaturated fluorinated hydrocarbon (hydrofluoro-olefin, which may be hereinafter referred to as "HFO"), such as 1,3,3,3-tetrafluoropropene (R1234ze) and 2,3,3,3-tetrafluoropropene (R1234yf), having a low global warming potential is used as a refrigerant, and a solution therefor has been demanded.

The present invention has been made in view of the problem, and an object of the present invention is to provide a lubricating oil composition excellent in the wear resistance, and a refrigerator oil composition excellent in the oxidation stability using the lubricating oil composition.

Solution to Problem

The present inventors have found that a lubricating oil composition containing a base oil and a particular phosphine derivative can solve the problem, and thus have completed the present invention.

The present invention relates to the following items [1] and [2].

[1] A lubricating oil composition containing a base oil (A) and a phosphine derivative (B) having one or more oxygen atom in a molecule.

[2] A refrigerator oil composition containing the lubricating oil composition according to the above item [1], and a refrigerant.

Advantageous Effects of Invention

According to the present invention, a lubricating oil composition excellent in the wear resistance, and a refrigerator oil composition excellent in the oxidation stability using the lubricating oil composition can be provided.

DESCRIPTION OF EMBODIMENTS

In the description herein, the "hydrocarbon group" means a group that is constituted only by a carbon atom and a hydrogen atom unless otherwise indicated. The "hydrocarbon group" includes an "aliphatic group" constituted by a linear chain or a branched chain, an "alicyclic group" having one or more saturated or unsaturated carbon ring having no aromaticity, and an "aromatic group" having one or more aromatic ring having aromaticity, such as a benzene ring.

In the description herein, the "number of ring carbon atoms" means the number of the carbon atoms in the atoms that constitute the ring of the compound having a structure containing atoms connected in the form of a ring. In the case where the ring is substituted by a substituent, the carbon atom contained in the substituent is not included in the number of ring carbon atoms.

The number of ring atoms means the number of the atoms that constitute the ring of the compound having a structure containing atoms connected in the form of a ring. In the case where the atom that does not constitute the ring (for example, a hydrogen atom terminating the bond of the atom constituting the ring) or the ring is substituted by a substituent, the atom contained in the substituent is not included in the number of ring atoms.

In the description herein, the term "a to b carbon atoms" in the expression "a substituted or unsubstituted X group having a to b carbon atoms" means the number of carbon atoms in the case where the X group is unsubstituted, and in the case where the X group is substituted, the number of the carbon atoms of the substituent is not included therein.

[Lubricating Oil Composition]

The lubricating oil composition of the present embodiment contains a base oil (A) and a phosphine derivative (B) having one or more oxygen atom in a molecule.

As a result of the investigation by the present inventors on the additive capable of enhancing the wear resistance of a lubricating oil, it has been found that the phosphine derivative (B) having one or more oxygen atom in the molecule exhibits a significant effect of enhancing the wear resistance, and an excellent oxidation stability can be obtained in the case where a refrigerator oil composition is formed with the lubricating oil composition along with a refrigerant.

On the other hand, a phosphine compound having no oxygen atom cannot provide a sufficient effect of enhancing the wear resistance, and a phosphate compound, such as tricresyl phosphate, which is not a phosphine derivative, cannot provide a sufficient oxidation stability in the case where a refrigerator oil composition is formed by mixing with a refrigerant.

The present inventors have found therefrom that the phosphine derivative (B) having one or more oxygen atom in the molecule exhibits a significant effect on the wear resistance of the lubricating oil composition and the suppression of the increase of the acid value of the refrigerator oil composition, and thus the present invention has been completed.

In the lubricating oil composition of the present embodiment, the total content of the component (A) and the component (B) is preferably 80 to 100% by mass, more preferably 85 to 100% by mass, further preferably 90 to 100% by mass, and still further preferably 95 to 100% by mass, based on the total amount (100% by mass) of the lubricating oil composition.

The components that are blended in the lubricating oil composition of the present embodiment will be described below.

<Base Oil (A)>

The lubricating oil composition of the present embodiment contains the base oil (A).

In the lubricating oil composition of the present embodiment, the content of the base oil (A) is preferably 85% by mass or more, more preferably 90% by mass or more, and further preferably 95% by mass or more, and is preferably 99.7% by mass or less, more preferably 99.3% by mass or less, and further preferably 99.0% by mass or less, all based on the total amount (100% by mass) of the lubricating oil composition.

The base oil (A) used may be, for example, one or more kind selected from the group consisting of a synthetic oil and a mineral oil.

The base oil (A) preferably contains one or more kind of a base oil (which may be hereinafter referred to as a "base oil (A1)") selected from the group consisting of a polyalkylene glycol compound (which may be hereinafter referred to as "PAG"), a polyvinyl ether compound (which may be hereinafter referred to as "PVE"), a polyol ester compound (which may be hereinafter referred to as "POE"), and a mineral oil from the standpoint of the enhancement of the thermal stability of the lubricating oil composition, more preferably contains one or more kind of a base oil (which may be hereinafter referred to as a "base oil (A2)") selected from the group consisting of PAG and PVE from the standpoint of the enhancement of the compatibility with a refrigerant, the standpoint of the enhancement of the hydrolysis resistance, and the standpoint of the enhancement of the thermal stability of the lubricating oil composition, and further preferably contains PAG (which may be hereinafter referred to as a "base oil (A3)") from the standpoint of the enhancement of the compatibility with a refrigerant, the standpoint of the enhancement of the hydrolysis resistance, and the standpoint of the further enhancement of the thermal stability of the lubricating oil composition.

The PVE, the PAG, the POE, and the mineral oil will be described in more detail below.

(Polyvinyl Ether Compound (PVE))

It suffices that the PVE is a polymer having one or more kind of a constitutional unit derived from vinyl ether.

In the case where the base oil (A) contains the PVE, the PVE may be used alone or as a combination of two or more kinds thereof.

The PVE is preferably a polymer that has one or more kind of a constitutional unit derived from vinyl ether and has an alkyl group having 1 to 4 carbon atoms on the side chain from the standpoint of the compatibility with a refrigerant. The alkyl group is preferably a methyl group or an ethyl group, and more preferably a methyl group, from the standpoint of the further enhancement of the compatibility with a refrigerant.

The PVE is preferably a polymer (A-1) having one or more kind of a constitutional unite represented by the following general formula (A-1).

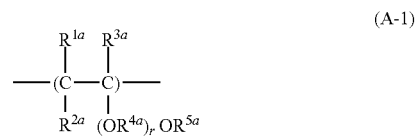

(A-1)

In the formula (A-1), $R^{1a}$, $R^{2a}$, and $R^{3a}$ each independently represent a hydrogen atom or a hydrocarbon group having 1 to 8 carbon atoms. $R^{4a}$ represents a divalent hydrocarbon group having 2 to 10 carbon atoms. $R^{5a}$ represents a hydrocarbon group having 1 to 10 carbon atoms. r is a repetition number of $OR^{4a}$ and represents a number of 0 to 10, preferably a number of 0 to 5, more preferably a number of 0 to 3, and further preferably 0. In the case where the constitutional unit represented by the general formula (A-1) contains plural groups represented by $OR^{4a}$, the plural groups represented by $OR^{4a}$ may be the same as or different from each other.

Examples of the hydrocarbon group having 1 to 8 carbon atoms represented by $R^{1a}$, $R^{2a}$, and $R^{3a}$ include an alkyl group, such as a methyl group, an ethyl group, a n-propyl group, an isopropyl group, a n-butyl group, an isobutyl group, a sec-butyl group, a tert-butyl group, various kinds of pentyl groups, various kinds of hexyl groups, various kinds of heptyl groups, and various kinds of octyl groups; a cycloalkyl group, such as a cyclopentyl group, a cyclohexyl group, various kinds of methylcyclohexyl groups, various kinds of ethylcyclohexyl groups, and various kinds of dimethylcyclohexyl groups; an aryl group, such as a phenyl group, various kinds of methylphenyl groups, various kinds of ethylphenyl groups, and various kinds of dimethylphenyl groups; and an arylalkyl group, such as a benzyl group, various kinds of phenylethyl groups, and various kinds of methylbenzyl groups.

The term "various kinds" herein means a "linear, branched, or cyclic" hydrocarbon group, and for example, the "various kinds of butyl groups" means various kinds of butyl groups including "a n-butyl group, a sec-butyl group, an isobutyl group, a tert-butyl group, and a cyclobutyl group". For a group having a cyclic structure, the term means that positional isomers, such as an ortho-isomer, a meta-isomer, and a para-isomer, which is thereinafter the same.

The number of carbon atoms of the hydrocarbon represented by $R^{1a}$, $R^{2a}$, and $R^{3a}$ is preferably 1 to 6, and more preferably 1 to 3.

$R^{1a}$, $R^{2a}$, and $R^{3a}$ each preferably independently represent a hydrogen atom or an alkyl group having 1 to 8 carbon atoms, and more preferably a hydrogen atom or an alkyl group having 1 to 3 carbon atoms.

Examples of the divalent hydrocarbon group having 2 to 10 carbon atoms represented by $R^{4a}$ include a divalent aliphatic group, such as an ethylene group, a 1,2-propylene group, a 1,3-propylene group, various kinds of butylene groups, various kinds of pentylene groups, various kinds of hexylene groups, various kinds of heptylene groups, various kinds of octylene groups, various kinds of nonylene groups, and various kinds of decylene groups; a divalent alicyclic group, such as cyclohexane, methylcyclohexane, ethylcyclohexane, dimethylcyclohexane, and propylcyclohexane; a divalent aromatic group, such as various kinds of phenylene groups, various kinds of methylphenylene groups, various kinds of ethylphenylene groups, various kinds of dimethylphenylene groups, and various kinds of naphthylene groups; a divalent alkyl aromatic group having a monovalent bonding site in each of an alkyl group moiety and an aromatic moiety of an alkyl aromatic hydrocarbon, such as toluene, xylene, and ethylbenzene; and a divalent alkyl aromatic group having bonding sites in an alkyl group moiety of a polyalkyl aromatic hydrocarbon, such as xylene and diethylbenzene.

The number of carbon atoms of the hydrocarbon group represented by R4a is preferably 2 to 6, and more preferably 2 to 4.

$R^{4a}$ preferably represents a divalent aliphatic group having 2 to 10 carbon atoms, and more preferably a divalent aliphatic group having 2 to 4 carbon atoms.

Examples of the hydrocarbon group having 1 to 10 carbon atoms represented by $R^{5a}$ include an alkyl group, such as a methyl group, an ethyl group, a n-propyl group, an isopropyl group, a n-butyl group, an isobutyl group, a sec-butyl group, a tert-butyl group, various kinds of pentyl groups, various kinds of hexyl groups, various kinds of heptyl groups, various kinds of octyl groups, various kinds of nonyl groups, and various kinds of decyl groups; a cycloalkyl group, such as a cyclopentyl group, a cyclohexyl group, various kinds of methylcyclohexyl groups, various kinds of ethylcyclohexyl groups, various kinds of propylcyclohexyl groups, various kinds of dimethylcyclohexyl groups; an aryl group, such as a phenyl group, various kinds of methylphenyl groups, various kinds of ethylphenyl groups, various kinds of dimethylphenyl groups, various kinds of propylphenyl groups, various kinds of trimethylphenyl groups, various kinds of butylphenyl groups, and various kinds of naphthyl groups; and an arylalkyl group, such as a benzyl group, various kinds of phenylethyl groups, various kinds of methylbenzyl groups, various kinds of phenylpropyl groups, and various kinds of phenylbutyl groups.

The number of carbon atoms of the hydrocarbon group represented by $R^{5a}$ is preferably 1 to 8, and more preferably 1 to 6.

$R^{5a}$ preferably represents an alkyl group having 1 to 6 carbon atoms, more preferably an alkyl group having 1 to 4 carbon atoms, further preferably a methyl group or an ethyl group, and still further preferably a methyl group, from the standpoint of the further enhancement of the compatibility with a refrigerant.

The number of units (polymerization degree) of the constitutional unit represented by the general formula (A-1) may be appropriately selected depending on the kinematic viscosity demanded for the base oil (A).

The polymer having the constitutional unit represented by the general formula (A-1) may be either a homopolymer having only one kind of the constitutional unit or a copolymer having two or more kinds of the constitutional units. In the case where the polymer is a copolymer, the mode of copolymerization is not particularly limited, and either a block copolymer, a random copolymer, or a graft copolymer may be used.

The PVE may contain a polyalkylene glycol structure in the structure thereof, and preferably does not contain a polyalkylene glycol structure.

A monovalent group derived from a saturated hydrocarbon, an ether, an alcohol, a ketone, an amide, a nitrile, or the like may be introduced to the end moiety of the polymer (A-1). Among these, one of the end moieties of the polymer (A-1) is preferably a group represented by the following general formula (A-1-i).

(A-1-i)

In the formula (A-1-i), the asterisk represents the bonding position to the carbon atom in the constitutional unit represented by the general formula (A-1).

In the formula (A-1-i), $R^{6a}$, $R^{7a}$, and $R^{8a}$ each independently represent a hydrogen atom or a hydrocarbon group having 1 to 8 carbon atoms, preferably a hydrogen atom or a hydrocarbon group having 1 to 6 carbon atoms, and more preferably a hydrogen atom or an alkyl group having 1 to 3 carbon atoms.

Examples of the hydrocarbon group having 1 to 8 carbon atoms represented by $R^{6a}$, $R^{7a}$, and $R^{8a}$ include the same ones as exemplified for the hydrocarbon group having 1 to 8 carbon atoms represented by $R^{1a}$, $R^{2a}$, and $R^{3a}$ in the general formula (A-1).

In the formula (A-1-i), $R^{9a}$ represents a divalent hydrocarbon group having 2 to 10 carbon atoms, preferably a divalent hydrocarbon group having 2 to 6 carbon atoms, and more preferably a divalent aliphatic group having 2 to 4 carbon atoms.

In the formula (A-1-i), r1 is a repetition number of $OR^{9a}$ and represents an integer of 0 to 10, preferably an integer of 0 to 5, more preferably an integer of 0 to 3, and further preferably 0. In the case where the constitutional unit represented by the general formula (A-1-i) contains plural groups represented by $OR^{9a}$, the plural groups represented by $OR^{9a}$ may be the same as or different from each other.

Examples of the divalent hydrocarbon group having 2 to 10 carbon atoms represented by $R^{9a}$ include the same ones as exemplified for the divalent hydrocarbon group having 2 to 10 carbon atoms represented by $R^{4a}$ in the general formula (A-1).

In the formula (A-1-i), $R^{10a}$ represents a hydrocarbon group having 1 to 10 carbon atoms, preferably a hydrocarbon group having 1 to 8 carbon atoms, and more preferably an alkyl group having 1 to 8 carbon atoms.

$R^{10a}$ preferably represents an alkyl group having 1 to 6 carbon atoms in the case where r1 in the general formula (A-1-i) is 0, and preferably represents an alkyl group having 1 to 4 carbon atoms in the case where r1 is 1 or more.

Examples of the hydrocarbon group having 1 to 10 carbon atoms represented by $R^{10a}$ include the same ones as exemplified for the hydrocarbon group having 1 to 10 carbon atoms represented by $R^{5a}$ in the general formula (A-1).

In the case where one of the end moieties of the polymer (A-1) is a group represented by the general formula (A-1-i), the other end moiety is preferably any one of a group represented by the above general formula (A-1-i), a group represented by the following general formula (A-1-ii), a group represented by the following general formula (A-1-iii), and a group having an olefinic unsaturated bond.

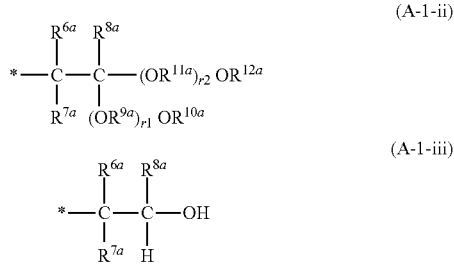

In the general formulae (A-1-ii) and (A-1-iii), $R^{6a}$, $R^{7a}$, $R^{8a}$, $R^{9a}$, $R^{10a}$, and r1 have the same meanings as in the general formula (A-1-i). In the general formula (A-1-ii), $R^{11a}$, $R^{12a}$, and r2 have the same meanings as $R^{9a}$, $R^{10a}$, and r1 in the general formula (A-1-i) respectively.

(Polyalkylene Glycol Compound (PAG))

The PAG is preferably a polymer (A-2) represented by the following general formula (A-2).

$$R^{13a}-[(OR^{14a})_m-OR^{15a}]_n \quad (A-2)$$

In the case where the base oil (A) contains the PAG, the PAG may be used alone or as a combination of two or more kinds thereof.

In the general formula (A-2), $R^{13a}$ represents a hydrogen atom, a monovalent hydrocarbon group having 1 to 10 carbon atoms, an acyl group having 2 to 10 carbon atoms, a divalent to hexavalent hydrocarbon group having 1 to 10 carbon atoms, or a substituted or unsubstituted heterocyclic group having 3 to 10 ring atoms; $R^{14a}$ represents an alkylene group having 2 to 4 carbon atoms; and $R^{15a}$ represents a hydrogen atom, a monovalent hydrocarbon group having 1 to 10 carbon atoms, an acyl group having 2 to 10 carbon atoms, or a substituted or unsubstituted heterocyclic group having 3 to 10 ring atoms.

Examples of the substituent that the heterocyclic group may have include an alkyl group having 1 to 10 (preferably 1 to 6, and more preferably 1 to 3) carbon atoms, a cycloalkyl group having 3 to 10 (preferably 3 to 8, and more preferably 5 or 6) ring carbon atoms, an aryl group having 6 to 18 (preferably 6 to 12) ring carbon atoms, a halogen atom (such as a fluorine atom, a chlorine atom, a bromine atom, and an iodine atom), a cyano group, a nitro group, a hydroxy group, and an amino group.

These substituents may be further substituted by an arbitrary one of the aforementioned substituents.

n represents an integer of 1 to 6, preferably an integer of 1 to 3, and more preferably 1.

n is determined by the number of bonding sites of $R^{13a}$ in the general formula (A-2). For example, n is 1 in the case where $R^{13a}$ is an alkyl group or an acyl group, and n is 2, 3, 4, 5, or 6 in the case where $R^{13a}$ is a hydrocarbon group or a heterocyclic group, and the valence of the group is 2, 3, 4, 5, or 6 respectively.

m is a repetition number of $OR^{14a}$ and represents a number of 1 or more, and preferably a number providing m×n of 6 to 80. The value of m is appropriately set in such a manner that the base oil (A) has a kinematic viscosity at 100° C. in a range of 2 to 50 mm$^2$/s, and is not particularly limited, as far as the kinematic viscosity is controlled to the predetermined range.

The plural groups represented by $R^{14a}$ may be the same as or different from each other. In the case where n is 2 or more, plural groups represented by $R^{15a}$ in one molecule may be the same as or different from each other.

Examples of the monovalent hydrocarbon group represented by $R^{13a}$ and $R^{15a}$ include an alkyl group, such as a methyl group, an ethyl group, a n-propyl group, an isopropyl group, a n-butyl group, an isobutyl group, a sec-butyl group, a tert-butyl group, various kinds of pentyl groups, various kinds of hexyl groups, various kinds of heptyl groups, various kinds of octyl groups, various kinds of nonyl groups, and various kinds of decyl groups; a cycloalkyl group, such as a cyclopentyl group, a cyclohexyl group, various kinds of methylcyclohexyl groups, various kinds of ethylcyclohexyl groups, various kinds of propylcyclohexyl groups, various kinds of dimethylcyclohexyl groups; an aryl group, such as a phenyl group, various kinds of methylphenyl groups, various kinds of ethylphenyl groups, various kinds of dimethylphenyl groups, various kinds of propylphenyl groups, various kinds of trimethylphenyl groups, various kinds of butylphenyl groups, and various kinds of naphthyl groups; and an arylalkyl group, such as a benzyl group, various kinds of phenylethyl groups, various kinds of methylbenzyl groups, various kinds of phenylpropyl groups, and various kinds of phenylbutyl groups. The alkyl group may be either linear or branched.

The number of carbon atoms of the monovalent hydrocarbon group represented by $R^{13a}$ and $R^{15a}$ is preferably 1 to 10, more preferably 1 to 6, and further preferably 1 to 3, from the standpoint of the compatibility with a refrigerant.

The hydrocarbon group moiety of the acyl group having 2 to 10 carbon atoms represented by $R^{13a}$ and $R^{15a}$ may be either linear, branched, or cyclic. Examples of the alkyl group moiety include the hydrocarbon groups represented by $R^{13a}$ and $R^{15a}$ that has 1 to 9 carbon atoms.

The number of carbon atoms of the acyl group represented by $R^{13a}$ and $R^{15a}$ is preferably 2 to 8, and more preferably 2 to 6, from the standpoint of the compatibility with a refrigerant.

Examples of the divalent to hexavalent hydrocarbon group represented by $R^{13a}$ include residual groups obtained by further removing 1 to 5 hydrogen atoms from the monovalent hydrocarbon group represented by $R^{13a}$, and a residual group obtained by removing hydroxy groups from a polyhydric alcohol, such as trimethylolpropane, glycerin, pentaerythritol, sorbitol, 1,2,3-trihydroxycyclohexane, and 1,3,5-trihydroxycyclohexane.

The number of carbon atoms of the divalent to hexavalent acyl group represented by $R^{13a}$ is preferably 2 to 10, and more preferably 2 to 6, from the standpoint of the compatibility with a refrigerant.

The heterocyclic group represented by $R^{13a}$ and $R^{15a}$ is preferably an oxygen atom-containing heterocyclic group or a sulfur atom-containing heterocyclic group. The heterocyclic group may be a saturated ring or an unsaturated ring.

Examples of the oxygen atom-containing heterocyclic group include residual groups obtained by removing 1 to 6 hydrogen atoms from an oxygen atom-containing saturated heterocyclic ring, such as ethylene oxide, 1,3-propylene oxide, tetrahydrofuran, tetrahydropyran, and hexamethylene oxide; and an oxygen atom-containing unsaturated heterocyclic ring, such as acetylene oxide, furan, pyran, oxacycloheptatriene, isobenzofuran, and isochromene.

Examples of the sulfur atom-containing heterocyclic group include residual groups obtained by removing 1 to 6 hydrogen atoms from a sulfur atom-containing saturated heterocyclic ring, such as ethylene sulfide, trimethylene sulfide, tetrahydrothiophene, tetrahydrothiopyran, and hexamethylene sulfide; and a sulfur atom-containing unsaturated heterocyclic ring, such as acetylene sulfide, thiophene, thiopyran, and thiotripyridene.

The heterocyclic group represented by $R^{13a}$ and $R^{15a}$ may have a substituent, and the substituent may be bonded to an oxygen atom in the general formula (A-2). Examples of the substituent have been described above, and the substituent is preferably an alkyl group having 1 to 6 carbon atoms, and more preferably an alkyl group having 1 to 3 carbon atoms.

The number of ring atoms of the heterocyclic group is preferably 3 to 10, and more preferably 3 to 6, from the standpoint of the compatibility with a refrigerant.

Examples of the alkylene group represented by $R^{14a}$ include an alkylene group having 2 carbon atoms, such as a dimethylene group (—$CH_2CH_2$—) and an ethylene group (—$CH(CH_3)$—); an alkylene group having 3 carbon atoms, such as a trimethylene group (—$CH_2CH_2CH_2$—), a propylene group (—$CH(CH_3)CH_2$—), a propylidene group (—$CHCH_2CH_3$—), and an isopropylidene group (—$C(CH_3)_2$—); and an alkylene group having 4 carbon atoms, such as a tetramethylene group (—$CH_2CH_2CH_2CH_2$—), a 1-methyltrimethylene group (—$CH(CH_3)CH_2CH_2$—), a 2-methyltrimethylene group (—$CH_2CH(CH_3)CH_2$—), and a butylene group (—$C(CH_3)_2CH_2$—). Among these, $R^{14a}$ preferably represents a propylene group (—$CH(CH_3)CH_2$—).

In the polymer (A-2) represented by the general formula (A-2), the content of the oxypropylene unit (—$OCH(CH_3)CH_2$—) is preferably 50% by mol or more, more preferably 65% by mol or more, and further preferably 80% by mol or more, based on the total amount (100% by mol) of the oxyalkylene ($OR^{14a}$) in the polymer (A-2).

In the polymer (A-2) represented by the general formula (A-2), one or more kind selected from the group consisting of a polyoxypropylene glycol dimethyl ether represented by the following general formula (A-2-i), a polyoxyethylene polyoxypropylene glycol dimethyl ether represented by the following general formula (A-2-ii), a polyoxypropylene glycol monobutyl ether represented by the following general formula (A-2-iii), and a polyoxypropylene glycol diacetate is preferred.

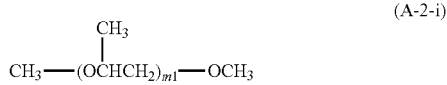

wherein in the formula (A-2-i), m1 represents a number of 1 or more, and preferably a number of 6 to 80.

wherein in the formula (A-2-ii), m2 and m3 each independently represent a number of 1 or more, and preferably represent numbers providing a value of m2+m3 of 6 to 80.

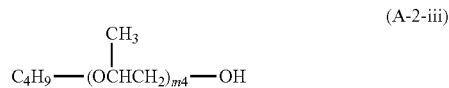

wherein in the formula (A-2-iii), m4 represents a number of 1 or more, and preferably a number of 6 to 80.

m1 in the general formula (A-2-i), m2 and m3 in the general formula (A-2-ii), and m4 in the general formula (A-2-iii) may be appropriately selected depending on the kinematic viscosity demanded for the base oil (A).

(Polyol Ester Compound (POE))

Examples of the POE include an ester of a diol or a polyol and a fatty acid. In the case where the base oil (A) contains the POE, the POE may be used alone or as a combination of two or more kinds thereof.

The POE is preferably an ester of a diol or a polyol having 3 to 20 hydroxy groups and a fatty acid having 3 to 20 carbon atoms.

Examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propaneoliol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol.

Examples of the polyol include a polyhydric alcohol, such as trimethylolethane, trimethylolpropane, trimethylolbutane, di(trimethylolpropane), tri(trimethylolpropane), pentaerythritol, di(pentaerythritol), tri(pentaerythritol), glycerin, a polyglycerin (such as a dimer to an icosamer of glycerin), 1,3,5-pentanetriol, sorbitol, sorbitan, a sorbitol glycerin condensate, adonitol, arabitol, xylitol, and mannitol; a saccharide, such as xylose, arabinose, ribose, rhamnose, glucose, fructose, galactose, mannose, sorbose, cellobiose, maltose, isomaltose, trehalose, sucrose, raffinose, gentianose, and merenditose; partially etherified products thereof; and a methyl glucoside (a glucoside).

Among these, a hindered alcohol, such as neopentyl glycol, trimethylolethane, trimethylolpropane, trimethylolbutane, di(trimethylolpropane), tri(trimethylolpropane), pentaerythritol, di(pentaerythritol), and tri(pentaerythritol), is preferred. The hindered alcohol herein means an alcohol that has a quaternary carbon atom bonded to four carbon atoms.

The number of carbon atoms of the fatty acid is preferably 3 or more, more preferably 4 or more, further preferably 5 or more, and still further preferably 8 or more, from the standpoint of the lubrication capability, and is preferably 20 or less, more preferably 16 or less, further preferably 12 or less, and still further preferably 10 or less, from the standpoint of the compatibility with a refrigerant.

The number of carbon atoms of the fatty acid includes the carbon atom of the carboxy group (—COOH) in the fatty acid.

While the fatty acid may be either a linear fatty acid or a branched fatty acid, a linear fatty acid is preferred from the standpoint of the lubrication capability, and a branched fatty acid is preferred from the standpoint of the hydrolysis stability. The fatty acid may be either a saturated fatty acid or an unsaturated fatty acid.

Examples of the fatty acid include a linear or branched fatty acid, such as isobutyric acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and oleic acid, and a so-called neo acid having a quaternary α-carbon atom.

More specifically, isobutyric acid, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, 3,5,5-trimethylhexanoic acid, and the like are preferred.

The POE may be a partial ester having the plural hydroxy groups of the polyol that partially remain unesterified, or may be a complete ester having the hydroxy groups that are all esterified. The POE may be a mixture of a partial ester and a complete ester, and is preferably a complete ester.

The POE is preferably an ester of a hindered alcohol, such as neopentyl glycol, trimethylolethane, trimethylolpropane, trimethylolbutane, (trimethylolpropane), tri(trimethylolpropane), pentaerythritol, di(pentaerythritol), and tri(pentaerythritol), and more preferably an ester of neopentyl glycol, trimethylolethane, trimethylolpropane, trimethylolbutane, or pentaerythritol is more preferred, from the standpoint of the achievement of the excellent hydrolysis stability, and is further preferably an ester of pentaerythritol from the standpoint of the achievement of the excellent compatibility with a refrigerant and the achievement of the excellent hydrolysis stability.

Specific examples of the preferred POE include a diester of neopentyl glycol and one kind or two or more kinds of a fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolethane and one kind or two or more kinds of a fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolpropane and one kind or two or more kinds of a fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolbutane and one kind or two or more kinds of a fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol and one kind or two or more kinds of a fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

The ester of two or more kinds of a fatty acid may be a mixture of two or more kinds of an ester of one kind of a fatty acid and a polyol. The POE is preferably an ester of a mixed fatty acid containing two or more kinds thereof and a polyol from the standpoint of the enhancement of the low temperature characteristics and the compatibility with a refrigerant.

(Mineral Oil)

Examples of the mineral oil include an oil that is obtained in such a manner that a paraffin based, intermediate, or naphthene based crude oil is subjected to atmospheric distillation to provide a lubricating oil fraction, or the crude oil is subjected to atmospheric distillation to provide an atmospheric residual oil, which is subjected to distillation under reduced pressure to provide a lubricating oil fraction, and the lubricating oil fraction is subjected one or more treatment of solvent deasphalting, solvent extraction, hydrocracking, solvent dewaxing, catalytic dewaxing, hydrorefining, and the like, an oil that is produced through isomerization of mineral oil based wax, and an oil that is produced through isomerization of GTL WAX (gas-to-liquid wax) produced by the Fischer-Tropsch process.

In the case where the base oil (A) contains the mineral oil, the mineral oil may be used alone or as a combination of two or more kinds thereof.

In the lubricating oil composition of the present embodiment, the major component of the base oil (A) is preferably the base oil (A1), more preferably the base oil (A2), and further preferably the base oil (A3). In the description herein, the "major component" means the component having the largest content.

The content of the base oil (A1), the base oil (A2), or the base oil (A3) in the base oil (A) is preferably 50 to 100% by mass, more preferably 60 to 100% by mass, further preferably 70 to 100% by mass, still further preferably 80 to 100% by mass, and still more further preferably 90 to 100% by mass, based on the total amount (100% by mass) of the base oil (A).

The base oil (A) may further contain an additional base oil, in addition to the base oil (A1), the base oil (A2), or the base oil (A3) within a range that does not impair the effects of the present invention.

Examples of the additional base oil include a synthetic oil that does not correspond to the PVE, the PAG, and the POE described above, such as a polyester compound, a polycarbonate compound, a hydrogenated product of an α-olefin oligomer, an alicyclic hydrocarbon compound, an alkylated aromatic hydrocarbon compound, and a copolymer of a poly(oxy)alkylene glycol or a monoether thereof and a polyvinyl ether (ECP).

The "copolymer of a poly(oxy)alkylene glycol or a monoether thereof and a polyvinyl ether (ECP)" is a copolymer having a constitutional unit derived from a poly(oxy)alkylene glycol or a monoether thereof and a constitutional unit derived from a polyvinyl ether, and the "poly(oxy)alkylene glycol" means both a polyalkylene glycol and a polyoxyalkylene glycol.

The base oil (A) preferably has a 40° C. kinematic viscosity of 5 to 120 mm$^2$/s, more preferably 10 to 110 mm$^2$/s, and further preferably 30 to 100 mm$^2$/s. In the case where the 40° C. kinematic viscosity of the base oil (A) is in the range, the wear resistance can be further improved.

In the description herein, the 40° C. kinematic viscosity is a value that is measured with a glass capillary viscometer according to JIS K2283:2000.

<Phosphine Derivative (B) Having One or More Oxygen Atom in Molecule>

The lubricating oil composition of the present embodiment contains a phosphine derivative (B) having one or more oxygen atom in a molecule.

In the description herein, the phosphine derivative means a compound having a structure having three hydrogen atoms of phosphine (PH3) that are replaced by carbon atoms, and a derivative thereof.

The component (B) may be used alone or as a combination of two or more kinds thereof.

In the lubricating oil composition of the present embodiment, the content of the component (B) in terms of phosphorus atom derived from the component (B) is preferably 200 to 2,000 ppm by mass, more preferably 300 to 1,800 ppm by mass, and further preferably 400 to 1,800 ppm by mass, based on the total amount of the lubricating oil composition, from the standpoint of the enhancement of the wear resistance.

The oxygen atom of the component (B) has a function enhancing the wear resistance enhancing effect of the component (B) through the coordination on the metal surface. The number of the oxygen atom in one molecule of the component (B) is preferably 1 or more, more preferably 2 or more, and further preferably 3 or more, from the standpoint of the enhancement of the wear resistance enhancing effect of the component (B). The upper limit of the number of the oxygen atom in one molecule of the component (B) is not particularly limited, and may be 10 or less, and may be 5 or less, from the standpoint of the availability, the balance to the other capabilities, and the like.

The number of the phosphorus atom in one molecule of the component (B) may be 1 or more, and from the standpoint of the enhancement of the solubility in the base oil, is preferably 3 or less, more preferably 2 or less, and most preferably 1.

Examples of the component (B) include a phosphine compound (B1) containing one or more oxygen atom in the molecule and a phosphine oxide compound (B2).

(Phosphine Compound (B1) Having One or More Oxygen Atom in Molecule)

The phosphine compound (B1) containing one or more oxygen atom in the molecule may be a compound having one phosphorus atom, and may be a compound having two or more phosphorus atoms.

Examples of the component (B1) having one phosphorus atom include a compound represented by the following general formula (B-1), and examples of the component (B1) having two or more phosphorus atoms include a compound represented by the following general formula (B-2).

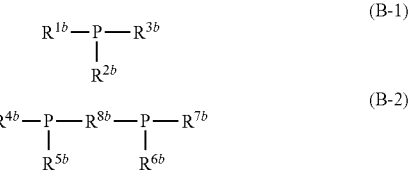

wherein in the formula (B-1), $R^{1b}$ to $R^{3b}$ each independently represent a substituted or unsubstituted hydrocarbon group having 1 to 20 carbon atoms, provided that at least one group of $R^{1b}$ to $R^{3b}$ has a substituent containing one or more oxygen atom, and in the formula (B-2), $R^{4b}$ to $R^{7b}$ each independently represent a substituted or unsubstituted hydrocarbon group having 1 to 20 carbon atoms, and $R^{8b}$ represents a substituted or unsubstituted divalent hydrocarbon group having 1 to 20 carbon atoms, which may contain an ether bond. In the case where $R^{8b}$ does not contain an ether bond, at least one group of $R^{4b}$ to $R^{8b}$ has a substituent containing one or more oxygen atom.

In the general formula (B-1), examples of the substituted or unsubstituted hydrocarbon group having 1 to 20 carbon atoms represented by $R^{1b}$ to $R^{3b}$ include a substituted or unsubstituted alkyl group having 1 to 20 carbon atoms, a substituted or unsubstituted alkenyl group having 2 to 20 carbon atoms, a substituted or unsubstituted alkynyl group having 2 to 20 carbon atoms, and a substituted or unsubstituted aryl group having 6 to 20 carbon atoms, and among these, a substituted or unsubstituted alkyl group having 1 to 20 carbon atoms and a substituted or unsubstituted aryl group having 6 to 20 carbon atoms are preferred, and a substituted or unsubstituted aryl group having 6 to 20 carbon atoms is more preferred.

Examples of the substituent of the hydrocarbon group include a halogen atom, a hydroxy group, an amino group, an imino group, an amide group, a carboxy group, an alkyl group having 1 to 5 carbon atoms, and an alkoxy group having 1 to 5 carbon atoms.

Examples of the substituted or unsubstituted alkyl group having 1 to 20 carbon atoms include an alkyl group, such as a methyl group, an ethyl group, a n-propyl group, an isopropyl group, a n-butyl group, an isobutyl group, a sec-butyl group, a tert-butyl group, various kinds of pentyl groups, various kinds of hexyl groups, various kinds of heptyl groups, various kinds of octyl groups, various kinds of nonyl groups, and various kinds of decyl groups; and a cycloalkyl group, such as a cyclopentyl group, a cyclohexyl group, various kinds of methylcyclohexyl groups, various kinds of ethylcyclohexyl groups, various kinds of propylcyclohexyl groups, and various kinds of dimethylcyclohexyl groups. The alkyl group may be either linear or branched.

The number of carbon atoms of the alkyl group is preferably 2 to 10, and more preferably 3 to 8.

Examples of the substituted or unsubstituted aryl group having 6 to 20 carbon atoms include a substituted or unsubstituted phenyl group and a substituted or unsubstituted naphthyl group, and among these, a substituted or unsubstituted phenyl group is preferred. Examples of the substituted or unsubstituted phenyl group include a phenyl group, various kinds of methoxyphenyl groups, various kinds of dimethoxyphenyl groups, various kinds of trimethoxyphenyl groups, various kinds of ethoxyphenyl groups, a 2,6-dimethyl-4-ethoxyphenyl group, various kinds of methylphenyl groups, various kinds of dimethylphenyl groups, and various kinds of trimethylphenyl groups. Among these, various kinds of methoxyphenyl groups, various kinds of dimethoxyphenyl groups, and various kinds of trimethoxyphenyl groups are preferred, various kinds of methoxyphenyl groups are more preferred, and a 4-methoxyphenyl group is further preferred.

The number of carbon atoms of the aryl group is preferably 6 to 10, and more preferably 6 to 8.

In the general formula (B-2), examples of the substituted or unsubstituted hydrocarbon group having 1 to 20 carbon atoms represented by $R^{4b}$ to $R^{7b}$ include the same ones as for $R^{1b}$ to $R^{3b}$ in the general formula (B-1).

Examples of the substituted or unsubstituted divalent hydrocarbon group having 1 to 20 carbon atoms, which may contain an ether bond, represented by $R^{8b}$ include a substituted or unsubstituted alkylene group having 1 to 20 carbon atoms, a substituted or unsubstituted alkenylene group having 2 to 20 carbon atoms, a substituted or unsubstituted alkynylene group having 2 to 20 carbon atoms, and a substituted or unsubstituted arylene group having 6 to 20 carbon atoms, all of which may contain an ether bond. Examples of the substituent on the hydrocarbon groups include the same ones as exemplified for the substituent of $R^{1b}$ to $R^{3b}$.

Examples of the substituted or unsubstituted alkylene group having 1 to 20 carbon atoms, which may contain an ether bond, include an ethylene group, a phenylethylene group, a 1,2-propylene group, a 2-phenyl-1,2-propylene group, a 1,3-propylene group, various kinds of butylene groups, various kinds of pentylene groups, various kinds of hexylene groups, various kinds of heptylene groups, various kinds of octylene groups, various kinds of nonylene groups, and various kinds of decylene groups.

Examples of the substituted or unsubstituted arylene group having 6 to 20 carbon atoms, which may contain an ether bond, include various kinds of phenylene groups, various kinds of methylphenylene groups, various kinds of ethylphenylene groups, various kinds of dimethylphenylene groups, various kinds of naphthylene, a diphenylene ether group, and a divalent group derived from 9,9-dimethylxanthene.

Examples of the phosphine compound (B1) containing one or more oxygen atom in the molecule include tris(2-methoxyphenyl)phosphine, tris(3-methoxyphenyl)phosphine, tris(4-methoxyphenyl)phosphine, tris(2,6-dimethoxyphenyl)phosphine, tris(2,4,6-trimethoxyphenyl)phosphine, bis((2-methoxyphenyl)phenylphosphino)ethane, bis(2-(diphenylphosphino)phenyl) ether, and 4,5-bis(diphenylphosphino)-9,9-dimethylxanthene.

(Phosphine Oxide Compound (B2))

The phosphine oxide compound (B2) may be a compound having one phosphorus atom, and may be a compound having two or more phosphorus atoms.

Examples of the component (B2) having one phosphorus atom include a compound represented by the following general formula (B-3), and examples of the component (B2) having two or more phosphorus atoms include a compound represented by the following general formula (B-4).

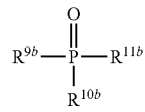
(B-3)

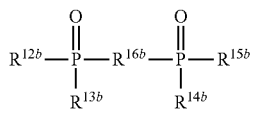
(B-4)

wherein in the formula (B-3), $R^{9b}$ to $R^{11b}$ each independently represent a substituted or unsubstituted hydrocarbon group having 1 to 20 carbon atoms, and in the formula (B-4), $R^{12b}$ to $R^{15b}$ each independently represent a substituted or unsubstituted hydrocarbon group having 1 to 20 carbon atoms, and $R^{16b}$ represents a substituted or unsubstituted divalent hydrocarbon group having 1 to 20 carbon atoms, which may contain an ether bond.

Examples of the substituted or unsubstituted hydrocarbon group having 1 to 20 carbon atoms represented by $R^{9b}$ to Rub include the same ones as for $R^{1b}$ to $R^{3b}$, and among these, a substituted or unsubstituted alkyl group having 1 to 20 carbon atoms and a substituted or unsubstituted aryl group having 6 to 20 carbon atoms are preferred, and a substituted or unsubstituted aryl group having 6 to 20 carbon atoms is more preferred. Examples of the substituent on the hydrocarbon group include the same ones as exemplified for the substituent of $R^{1b}$ to $R^{3b}$.

Examples of the substituted or unsubstituted alkyl group having 1 to 20 carbon atoms include the same ones as exemplified for the substituted or unsubstituted alkyl group having 1 to 20 carbon atoms represented by $R^{1b}$, $R^{2b}$, and $R^{3b}$, and the preferred embodiments thereof are also the same.

Examples of the substituted or unsubstituted aryl group having 6 to 20 carbon atoms include the same ones as exemplified for the substituted or unsubstituted aryl group having 6 to 20 carbon atoms represented by $R^{1b}$, $R^{2b}$, and $R^{3b}$ in the general formula (B-1). Among these, a substituted or unsubstituted phenyl group is preferred, and a phenyl group is more preferred.

The number of carbon atoms of the aryl group is preferably 6 to 10, and more preferably 6 to 8.

Examples of the substituted or unsubstituted hydrocarbon group having 1 to 20 carbon atoms represented by $R^{12b}$ to $R^{15b}$ in the general formula (B-4) include the same ones as for the substituted or unsubstituted hydrocarbon group having 1 to 20 carbon atoms represented by $R^{4b}$ to $R^{7b}$ in the general formula (B-2), and the preferred embodiments thereof are also the same.

In the general formula (B-4), examples of substituted or unsubstituted divalent hydrocarbon group having 1 to 20 carbon atoms, which may contain an ether bond, represented by $R^{16b}$ include the same ones as for the substituted or unsubstituted divalent hydrocarbon group having 1 to 20 carbon atoms represented by $R^{8b}$ in the general formula (B-2), and the preferred embodiments thereof are also the same.

Examples of the phosphine oxide compound (B2) include triphenylphosphine oxide, tri-n-octylphosphine oxide, and bis(2-((oxo)diphenylphosphino)phenyl) ether.

Among the components (B), one or more kind selected from the group consisting of the compound represented by the general formula (B-1) and the compound represented by the general formula (B-3) is preferred, one or more kind selected from the group consisting of tris(4-methoxyphenyl) phosphine, triphenylphosphine oxide, bis(2-(diphenylphosphino)phenyl) ether, and 4,5-bis(diphenylphosphino)-9,9-dimethylxanthene is more preferred, and one or more kind selected from the group consisting of tris(4-methoxyphenyl) phosphine and triphenylphosphine oxide is further preferred, from the standpoint of the wear resistance and the oxidation stability.

<Phosphorus Based Compound (C)>

The lubricating oil composition of the present embodiment preferably further contains one or more kind of a phosphorus based compound (C) selected from the group consisting of a phosphite ester based compound and a polyphosphate based compound, from the standpoint of the enhancement of the wear resistance.

In the case where the lubricating oil composition of the present embodiment contains the phosphorus based compound (C), the content thereof in terms of phosphorus atom derived from the component (C) is preferably 50 to 1,000 ppm by mass, and more preferably 100 to 700 ppm by mass, based on the total amount of the lubricating oil composition, from the standpoint of the enhancement of the wear resistance.

In the lubricating oil composition of the present embodiment, the total content of the phosphorus atom content derived from the component (B) and the phosphorus atom content derived from the component (C) is preferably 250 to 3,000 ppm by mass, more preferably 300 to 2,500 ppm by mass, and further preferably 500 to 2,500 ppm by mass.

(Phosphite Ester Based Compound)

Examples of the phosphite ester based compound include an aryl hydrogen phosphite, an alkyl hydrogen phosphite, an aryl phosphite, an alkyl phosphite, an alkenyl phosphite, and an alkylaryl phosphite. Among these, an alkylaryl phosphite is preferred.

The alkylaryl phosphite is preferably a tris(alkylaryl) phosphite, and examples of the alkyl group constituting the alkylaryl group include an alkyl group having 1 to 20 carbon atoms, specific examples of which include a methyl group, an ethyl group, a n-propyl group, an isopropyl group, a n-butyl group, an isobutyl group, a sec-butyl group, a tert-butyl group, various kinds of pentyl groups, various kinds of hexyl groups, various kinds of heptyl groups, various kinds of octyl groups, various kinds of nonyl groups, and various kinds of decyl groups. The number of carbon atoms of the alkyl group is preferably 5 to 15, and more preferably 7 to 12.

Examples of the aryl group constituting the alkylaryl group include a phenyl group and a naphthyl group, and among these, a phenyl group is preferred.

Specific examples of the phosphite ester based compound include triphenyl phosphite, diphenyl nonyl phosphite, diphenyl (2-ethylhexyl) phosphite, tris(2,4-di-tert-butylphenyl) phosphite, trisnonylphenyl phosphite, diphenyl isooctyl phosphite, 2,2'-methylenebis(4,6-di-tert-butylphenyl) octyl phosphite, phenyl diisodecyl phosphite, diphenyl mono(tridecyl) phosphite, diphenyl isodecyl phosphite, phenyl di(tridecyl) phosphite, tris(2-ethylhexyl) phosphite, tris(isodecyl) phosphite, tris(tridecyl) phosphite, dibutyl hydrogen phosphite, trilauryl trithiophosphite, tetrakis(2,4-di-tert-butylphenyl)-4,4'-biphenylene diphosphonite, 4,4'-isopropylidene diphenol dodecyl phosphite, 4,4'-isopropylidene diphenol tridecyl phosphite, 4,4'-isopropylidene diphenol tetradecyl phosphite, 4,4'-isopropylidene diphenol pentadecyl phosphite, 4,4'-butylidene bis(3-methyl-6-tert-butylphenyl) ditridecyl phosphite, 1,1,3-tris(2-methyl-4-tridecyl phosphite-5-tert-butylphenyl)butane, bis(2,4-di-tert-butylphenyl) pentaerythritol diphosphite, 2-ethylhexyl diphenyl phosphite, and dioleyl hydrogen phosphite. The phosphite ester based compound may be used alone or as a combination of two or more kinds thereof.

(Polyphosphate Based Compound)

The polyphosphate based compound is a phosphate compound having at least two phosphoric acid skeletons in one molecule, and is preferably a compound represented by the following general formula (C-1). The polyphosphate based compound may be used alone or as a combination of two or more kinds thereof.

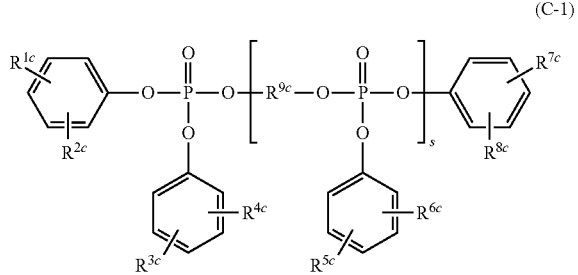

(C-1)

In the general formula (C-1), s represents an integer of 1 to 10, $R^{1c}$ to $R^{8c}$ each independently represent a hydrogen atom or an alkyl group having 1 to 20 carbon atoms, and Roe represents a divalent hydrocarbon group having 2 to 20 carbon atoms.

The alkyl group having 1 to 20 carbon atoms represented by $R^{1c}$ to $R^{8c}$ may be either linear, branched, or cyclic, and specific examples thereof include a methyl group, an ethyl group, a n-propyl group, an isopropyl group, various kinds of butyl groups, various kinds of pentyl groups, various kinds of hexyl groups, various kinds of heptyl groups, various kinds of octyl groups, various kinds of nonyl groups, various kinds of decyl groups, various kinds of undecyl groups, various kinds of dodecyl groups, various kinds of tridecyl groups, various kinds of tetradecyl groups, various kinds of pentadecyl groups, various kinds of hexadecyl groups, various kinds of heptadecyl groups, and various kinds of octadecyl groups.

$R^{1c}$ to $R^{8c}$ each preferably represent a hydrogen atom or an alkyl group having 1 to 4 carbon atoms, more preferably a hydrogen atom or a methyl group, and further preferably a hydrogen atom.

The divalent hydrocarbon group having 1 to 20 carbon atoms represented by $R^{9c}$ is preferably an alkylene group, an arylene group, or a hydrocarbon group formed of an arylene group and an alkylene group, and more preferably a group containing an arylene group.

Examples of the alkylene group represented by $R^{9c}$ include a linear or branched alkylene group, such as an ethylene group, a propylene group, a butylene group, a pentylene group, a hexylene group, a heptylene group, an octylene group, a nonylene group, a decylene group, an undecylene group, a dodecylene group, a tetradecylene group, a hexadecylene group, an octadecylene group, and an icosalene group; and a cyclic alkylene group, such as a cyclopropylene group, a cyclobutylene group, a cyclopentylene group, a cyclohexylene group, a cycloheptylene group, a cyclooctylene group, a dicyclopentylene group, and a tricyclopentylene group. The alkylene group referred herein includes an alkylidene group.

The arylene group represented by $R^{9c}$ may be an arylene group, which may be either substituted or unsubstituted, and specific examples thereof include a substituted or unsubstituted phenylene group, a substituted or unsubstituted naphthylene group, and a substituted or unsubstituted biphenylene group. Among these, an unsubstituted arylene group is preferred, and a phenylene group is more preferred.

In the case where $R^{9c}$ is the hydrocarbon group formed of an arylene group and an alkylene group, examples of the arylene group constituting the hydrocarbon group include the same ones as above. Examples of the alkylene group constituting the hydrocarbon group include a linear, branched, or cyclic alkylene group having 1 to 14 carbon atoms, and specific examples thereof include a methylene group and the same ones as for the alkylene group described for P. The alkylene group is preferably a linear or branched alkylene group having 1 to 5 carbon atoms, examples of which include a methylene group; various kinds of ethylene groups, such as a 1,1-ethylene group and a 1,2-ethylene group; various kinds of propylene groups, such as 1,3-propylene group, a 1,2-propylene group, and a 2,2-propylene group; various kinds of butylene groups; and various kinds of pentylene groups, and among these, a 2,2-propylene group (—C(CH$_3$)$_2$—) is more preferred.

In the general formula (C-1), s preferably represents an integer of 1 to 8, more preferably an integer of 1 to 5, further preferably an integer of 1 to 3, and still further preferably 1. The molecular weight is decreased by decreasing s, and thereby the solubility thereof in the component (A) can be readily increased, and furthermore the friction coefficient can be readily decreased. In the case where s is an integer of 2 or more, the plural constitutional units in which the repetition number is represented by s may be the same as or different from each other.

Preferred examples of $R^{9c}$ include a group represented by the following general formula (C-2), (C-3), or (C-4), and a group represented by the general formula (C-2) or (C-3) is more preferred, and a group represented by the general formula (C-2) is further preferred. The general formula (C-2) may be either an ortho-isomer, a meta-isomer, or a para-isomer, and is preferably a meta-isomer.

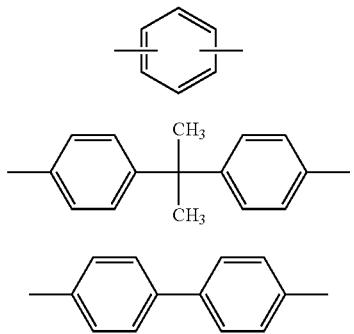

More preferred examples of the polyphosphate based compound include a compound represented by the following general formula (C-5) or (C-6). Among these, a compound represented by the following general formula (C-5) is further preferred.

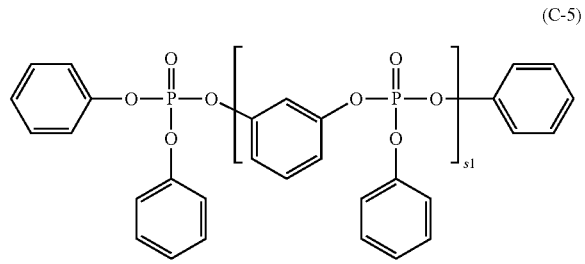

In the general formula (C-5), s1 represents an integer of 1 to 10, preferably an integer of 1 to 8, more preferably an integer of 1 to 5, and further preferably an integer of 1 to 3.

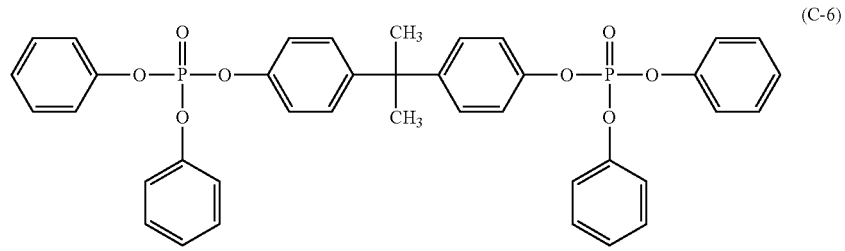

<Additives>

The lubricating oil composition of the present embodiment may further contain additives in such a range that does not impair the effects of the present invention.

As the additives, from the standpoint of improving the stability of the lubricating oil composition, one or more kind selected from the group consisting of an antioxidant, an oiliness improver, an oxygen scavenger, a copper deactivator, a rust inhibitor, an anti-foaming agent, and a viscosity index improver is preferably contained, and at least an antioxidant is more preferably contained. The lubricating oil composition of the present embodiment may contain an extreme pressure agent other than the components (B) and (C).

The additives each may contain alone or as a combination of two or more kinds thereof.

The total content of the additives is preferably 0 to 10% by mass, more preferably 0.01 to 5% by mass, and further preferably 0.1 to 3% by mass, based on the total amount (100% by mass) of the lubricating oil composition.

(Antioxidant)

The antioxidant is preferably one or more kind selected from the group consisting of a phenol-based antioxidant and an amine based antioxidant.

Examples of the phenol-based antioxidant include 2,6-di-tert-butyl-4-methylphenol (DBPC), 2,6-di-tert-butyl-4-ethylphenol, and 2,2'-methylenebis(4-methyl-6-tert-butylphenol)

Examples of the amine based antioxidant include phenyl-α-naphthylamine and N,N'-diphenyl-p-phenylenediamine.

Among these, 2,6-di-tert-butyl-4-methylphenol (DBPC) is preferred.

The content of the antioxidant is preferably 0.01 to 5% by mass, and more preferably 0.05 to 3% by mass, based on the total amount (100% by mass) of the lubricating oil composition, from the standpoint of the stability and the antioxidation capability.

(Oiliness Improver)

Examples of the oiliness improver include an aliphatic saturated or unsaturated monocarboxylic acid, such as stearic acid and oleic acid; a polymerized fatty acid, such as a dimer acid and a hydrogenated dimer acid; a hydroxyfatty acid, such as ricinoleic acid and 12-hydroxystearic acid; an aliphatic saturated or unsaturated monoalcohol, such as lauryl alcohol and oleyl alcohol; an aliphatic saturated or unsaturated monoamine, such as stearylamine and oleylamine; an aliphatic saturated or unsaturated monocarboxylic acid amide, such as lauric amide and oleic amide; and a partial ester of a polyhydric alcohol, such as glycerin and sorbitol, and an aliphatic saturated or unsaturated monocarboxylic acid.

(Oxygen Scavenger)

Examples of the oxygen scavenger include an aliphatic unsaturated compound and a terpene compound having a double bond.

The aliphatic unsaturated compound is preferably an unsaturated hydrocarbon, and specific examples thereof include an olefin; and a polyene, such as a diene and a triene.

The olefin is preferably an α-olefin, such as 1-tetradecene, 1-hexadecene, and 1-octadecene, from the standpoint of the reactivity with oxygen.

The aliphatic unsaturated compound is also preferably, in addition to the above, an unsaturated aliphatic alcohol having a conjugated double bonds, such as vitamin A shown by the molecular formula $C_{20}H_{30}O$ ((2E,4E,6E,8E)-3,7-dimethyl-9-(2,6,6-trimethylcyclohex-1-yl)nona-2,4,6,8-tetraen-1-ol), from the standpoint of the reactivity with oxygen.

The terpene compound having a double bond is preferably a terpene based hydrocarbon having a double bond, and is more preferably α-farnesene ($C_{15}H_{24}$: 3,7,11-trimethyldodeca-1,3,6,10-tetraene) and β-farnesene ($C_{15}H_{24}$: 7,11-dimethyl-3-methylidenedodeca-1,6,10-triene), from the standpoint of the reactivity with oxygen.

(Copper Deactivator)

Examples of the copper deactivator include an N—(N,N'-dialkyl(e.g., an alkyl group having 3 to 12 carbon atoms) aminomethyl)triazole.

(Rust Inhibitor)

Examples of the rust inhibitor include a metal sulfonate, an aliphatic amine compound, an organic phosphite ester, an organic phosphate, an organic metal sulfonate salt, an organic metal phosphate salt, an alkenyl succinate, and a polyhydric alcohol ester.

(Anti-Foaming Agent)

Examples of the anti-foaming agent include a silicone based anti-foaming agent, such as a silicone oil and a fluorinated silicone oil.

(Viscosity Index Improver)

Examples of the viscosity index improver include a polymethacrylate, a polyisobutylene, an ethylene-propylene copolymer, and a hydrogenated styrene-diene copolymer.

(Extreme Pressure Agent Other than Components (B) and (C))

Examples of the extreme pressure agent other than the components (B) and (C) include a phosphorus based extreme pressure agent other than the components (B) and (C), a metal salt of a carboxylic acid, and a sulfur based extreme pressure agent.

Examples of the phosphorus based extreme pressure agent other than the components (B) and (C) include a phosphate other than the component (C), an acidic phosphate, a phosphite other than the component (C), an acidic phosphite, and amine salts of these compounds. Specific examples thereof include tricresyl phosphate (TCP), trithiophenyl phosphate, tri(nonylphenyl) phosphite, dioleyl hydrogen phosphite, and 2-ethylhexyl diphenyl phosphite.

Examples of the metal salt of a carboxylic acid include a metal salt of a carboxylic acid having 3 to 60 (preferably 3 to 30) carbon atoms. Among these, one or more kind selected from the group consisting of metal salts of a fatty acid having 12 to 30 carbon atoms and a dicarboxylic acid having 3 to 30 carbon atoms is preferred. The metal constituting the metal salt is preferably an alkali metal and an alkaline earth metal, and more preferably an alkali metal.

Examples of the sulfur based extreme pressure agent include a sulfurized oil or fat, a sulfurized fatty acid, a sulfurized ester, a sulfurized olefin, a dihydrocarbyl polysulfide, a thiocarbamate compound, a thioterpene compound, and a dialkyl thiodipropionate compound.

In the lubricating oil composition of the present embodiment, the component (B) or the components (B) and (C) exert the effect as an extreme pressure agent, and therefore the extreme pressure agent other than the components (B) and (C) may not be contained.

In the case where the lubricating oil composition of the present embodiment contains the extreme pressure agent other than the components (B) and (C), the content thereof is preferably 1% by mass or less, more preferably 0.5% by mass or less, and further preferably 0.1% by mass or less, based on the total amount (100% by mass) of the lubricating oil composition, from the standpoint of the lubrication capability and the stability.

The lubricating oil composition of the present embodiment preferably does not contain a phosphate other than the component (C), and more preferably does not contain tricresyl phosphate, from the standpoint of the enhancement of the oxidation stability in the form of a refrigerator oil composition. In the case where the lubricating oil composition of the present embodiment contains a phosphate other than the component (C), the content thereof in terms of phosphorus atom derived from the phosphate other than the component (C) is preferably 500 ppm by mass or less, more preferably 100 ppm by mass, and further preferably 10 ppm by mass or less, based on the total amount of the lubricating oil composition.

<Properties of Lubricating Oil Composition>

The water content of the lubricating oil composition of the present embodiment is preferably 800 ppm by mass or less, more preferably 700 ppm by mass or less, further preferably 500 ppm by mass or less, still further preferably 300 ppm by mass or less, still more further preferably less than 300 ppm by mass, still more further preferably 200 ppm by mass or less, and still more further preferably 100 ppm by mass or less.

The lubricating oil composition of the present embodiment exerts the excellent effect of suppressing the increase of the acid value, and therefore there is no necessity of water contained in a certain amount or more for suppressing the increase of the acid value even if the water content is sufficiently low.

<Applications of Lubricating Oil Composition>

The lubricating oil composition of the present embodiment can be favorably applied to an internal combustion engine oil used in a gasoline engine, a diesel engine, and other internal combustion engines; an automobile gear oil for a gasoline automobile, a hybrid automobile, an electric automobile, and the like; a gear oil, such as an industrial gear oil for a general machine or the like; and a refrigerator oil used with a refrigerant, due to the excellent wear resistance thereof. The lubricating oil composition of the present embodiment is favorable as a refrigerator oil since a high oxidation stability can be obtained particularly in the use with a refrigerant.

The refrigerator herein has a refrigeration cycle constituted by a compressor, a condenser, an expansion mechanism (such as an expansion valve), and an evaporator, or by a compressor, a condenser, an expansion mechanism, a dryer, and an evaporator as the essential components. The lubricating oil composition of the present embodiment is preferably applied, for example, for lubricating a sliding portion of the compressor or the like.

Accordingly, the present invention also provides a lubricating method including applying the lubricating oil composition of the present embodiment to a sliding portion inside a refrigerator.

The lubricating oil composition of the present embodiment can also be applied, for example, to an air conditioner, a refrigeration chamber, an automatic vending machine, a showcase, a refrigeration system, a hot water supply machine, or a warming system.

Examples of the air conditioner include an automobile air conditioner, such as an open automobile air conditioner and an electric automobile air conditioner, and a gas heat pump (GHP) air conditioner.

[Refrigerator Oil Composition]

The refrigerator oil composition of the present embodiment is a refrigerator oil composition containing the lubricating oil composition of the present embodiment and a refrigerant.

The refrigerator oil composition of the present embodiment can provide an excellent oxidation stability due to the use of the lubricating oil composition of the present embodiment. The mechanism therefor may not be clear, but can be estimated as follows.

In association with the reduction in size of a refrigerator in recent years, the reduction of the amount of the lubricating oil composition used in the equipment proceeds, and a portion that locally becomes high temperature occurs in the refrigerator through the frictional heat or the like at the sliding portion in the compressor due to the operation condition becoming severer. In the case where a phosphate, such as TCP, is used under the severe environment, the ester group of the phosphate is decomposed with an acidic substance formed with the decomposition product of the refrigerant, thereby increasing the acid value. It is considered that the phosphine derivative contained in the lubricating oil composition of the present embodiment has a high stability since no ester bond is contained as different from TCP, resulting in the suppression of the decomposition with the acidic substance, and thus the increase of the acid value can be suppressed.

<Refrigerant>

Examples of the refrigerant include a fluorinated hydrocarbon refrigerant, such as an unsaturated fluorinated hydrocarbon compound and a saturated fluorinated hydrocarbon compound; and a natural refrigerant, such as a hydrocarbon, carbon dioxide, and ammonia. These materials may be used alone or as a combination of two or more kinds thereof. Among these, the refrigerant preferably contains one or more kind selected from the group consisting of an unsaturated fluorinated hydrocarbon compound, a saturated fluorinated hydrocarbon compound, a hydrocarbon, carbon dioxide, and ammonia, and more preferably contains an unsaturated fluorinated hydrocarbon compound.

The refrigerants will be described below.

<Unsaturated Fluorinated Hydrocarbon Compound>

An unsaturated fluorinated hydrocarbon compound has a defect that due to the low thermal stability thereof at a high temperature, the use thereof as a refrigerant may form an acidic substance, such as hydrogen fluoride (HF), to cause the increase of the acid value, but the use of the lubricating oil composition of the present embodiment can avoid the defect of the unsaturated fluorinated hydrocarbon compound, i.e., the increase of the acid value, and can secure the stability of the refrigeration system or the like using an unsaturated fluorinated hydrocarbon compound as a refrigerant.

Accordingly, in the lubricating oil composition of the present embodiment, the refrigerant is preferably a refrigerant that contains an unsaturated fluorinated hydrocarbon compound (HFO).

The content of the unsaturated fluorinated hydrocarbon compound (HFO) in the refrigerant is preferably 50% by mass or more, more preferably 70% by mass or more, and further preferably 90% by mass or more, based on the total amount (100% by mass) of the refrigerant, and the refrigerant is still further preferably a refrigerant that contains only an unsaturated fluorinated hydrocarbon compound (HFO).

Examples of the unsaturated fluorinated hydrocarbon compound include those having a carbon-carbon double bond, such as a fluoride of a chain-like, e.g., linear or branched, olefin having 2 to 6 carbon atoms or a fluoride of a cyclic olefin having 4 or more and 6 or less carbon atoms.

More specific examples thereof include ethylene having 1 to 3 fluorine atoms introduced thereto, propene having 1 to 5 fluorine atoms introduced thereto, butene having 1 to 7 fluorine atoms introduced thereto, pentene having 1 to 9 fluorine atoms introduced thereto, hexene having 1 to 11 fluorine atoms introduced thereto, cyclobutene having 1 to 5 fluorine atoms introduced thereto, cyclopentene having 1 to 7 fluorine atoms introduced thereto, and cyclohexene having 1 to 9 fluorine atoms introduced thereto.

Among these unsaturated fluorinated hydrocarbon compounds, a fluoride of propene is preferred, propene having 3 to 5 fluorine atoms introduced thereto is more preferred, and propene having 4 fluorine atoms introduced thereto is further preferred. Specific examples of the preferred compound include 1,3,3,3-tetrafluoropropene (R1234ze) and 2,3,3,3-tetrafluoropropene (R1234yf).

The unsaturated fluorinated hydrocarbon compound may be used alone or as a combination of two or more kinds thereof, and may be used in combination with a refrigerant other than the unsaturated fluorinated hydrocarbon compound. Examples of the use in combination with a refrigerant other than the unsaturated fluorinated hydrocarbon compound include a mixed refrigerant of a saturated fluorinated hydrocarbon compound and an unsaturated fluorinated hydrocarbon compound. Examples of the mixed refrigerant include a mixed refrigerant of R32 and R1234yf, and a mixed refrigerant of R32, R1234ze, and R152a (AC5, mixing ratio: 13.23/76.20/9.96).

The saturated fluorinated hydrocarbon compound is preferably a fluoride of an alkane having 1 to 4 carbon atoms, more preferably a fluoride of an alkane having 1 to 3 carbon atoms, and further preferably a fluoride of an alkane having 1 or 2 carbon atoms (methane or ethane). Examples of the fluoride of methane or ethane include trifluoromethane (R23), difluoromethane (R32), 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134), and 1,1,1,2,2-pentafluoroethane (R125), and among those, difluoromethane and 1,1,1,2,2-pentafluoroethane are preferred.

The saturated fluorinated hydrocarbon compound may be used alone or as a combination of two or more kinds thereof. Examples of the combination use of two or more kinds thereof include a mixed refrigerant of two or more kinds of saturated fluorinated hydrocarbon compounds having 1 to 3 carbon atoms, and a mixed refrigerant of two or more kinds of saturated fluorinated hydrocarbon compounds having 1 to 2 carbon atoms.

Examples of the mixed refrigerant include a mixture of R32 and R125 (R410A), a mixture of R125, R143a, and R134a (R404A), a mixture of R32, R125, and R134a (such as R407A, R407C, and R407E), and a mixture of R125 and R143a (R507A).

<Natural Refrigerant>

Examples of the natural refrigerant include one or more kind selected from the group consisting of a hydrocarbon (HC) based refrigerant, carbon dioxide ($CO_2$), and ammonia, and a hydrocarbon (HC) based refrigerant is preferred. These materials may be used alone or as a combination of two or more kinds thereof, and may be combined with a refrigerant other than the natural refrigerant. Examples of the combination use with a refrigerant other than the natural refrigerant include a mixed refrigerant with a saturated fluorinated hydrocarbon compound and/or an unsaturated fluorinated hydrocarbon compound. Specific examples of the mixed refrigerant include a mixed refrigerant of carbon dioxide, R1234ze, and R134a (AC6, mixing ratio: 5.15/79.02/15.41).

The hydrocarbon (HC) based refrigerant is preferably a hydrocarbon having 1 to 8 carbon atoms, more preferably a hydrocarbon having 1 to 5 carbon atoms, and further preferably a hydrocarbon having 3 to 5 carbon atoms. With a number of carbon atoms of 8 or less, the boiling point of the refrigerant may not be too high to provide a preferred refrigerant. Examples of the hydrocarbon based refrigerant include methane, ethane, ethylene, propane (R290), cyclopropane, propylene, n-butane, isobutane (R600a), 2-methylbutane, n-pentane, isopentane, cyclopentane, isobutane, and n-butane.

The hydrocarbon based refrigerant may be used alone or as a combination of two or more kinds thereof. The hydrocarbon based refrigerant may be used as only the hydrocarbon based refrigerant, or may be used as a mixed refrigerant obtained by mixing a refrigerant other than the hydrocarbon based refrigerant, such as a fluorinated hydrocarbon refrigerant, e.g., R134a, and carbon dioxide.

In the refrigerator oil composition of the present embodiment, the amounts of the refrigerant and the lubricating oil composition used in terms of mass ratio of lubricating oil composition/refrigerant is preferably 1/99 to 90/10, and more preferably 5/95 to 70/30. In the case where the mass ratio of lubricating oil composition/refrigerant is in the range, the lubrication capability and the favorable refrigeration capability in the refrigerator can be achieved.

The refrigerator oil composition of the present embodiment is preferably applied, for example, to an air conditioner, a refrigeration chamber, an automatic vending machine, a showcase, a refrigeration system, a hot water supply machine, or a warming system. Examples of the air conditioner include an automobile air conditioner, such as an open automobile air conditioner and an electric automobile air conditioner, and a gas heat pump (GHP) air conditioner.

EXAMPLES

The present invention will be described in more detail with reference to examples below, but the present invention is not limited to the examples.

The kinds of the components used in the preparation of the lubricating oil compositions of Examples and Comparative Examples are shown below.

(1) Base Oil

A polyvinyl ether compound (PVE) having a 40° C. kinematic viscosity of 72.0 mm²/s or a polyalkylene glycol compound (PAG) having a 40° C. kinematic viscosity of 47.0 mm²/s was used as a base oil.

The 40° C. kinematic viscosity was measured with a glass capillary viscometer according to JIS K2283:2000.

(2) Antioxidant 2,6,-Di-tert-butyl-4-methylphenol (DBPC)

(3) Component (B)

Tris(p-methoxyphenyl)phosphine (TPAP)

Triphenylphosphine oxide (TPPO)

(4) Component (C)

Trisnonylphenyl phosphite

Tetraphenyl-m-phenylene bisphosphate (5) Comparative Extreme Pressure Agent

Tricresyl phosphate (TCP)

Triphenylphosphine (TPP)

(6) Refrigerant 2,3,3,3-tetrafluoropropene (R1234yl)

Examples 1 to 9 and Comparative Examples 1 to 3

Lubricating oil compositions having the compositions shown in Table 1 were prepared, and evaluated for the wear resistance and the oxidation stability in the following manners. The evaluation results are shown in Table 1. The unit of the blending composition in Table 1 is "% by mass".

[Falex Wear Test]

(1) The following materials were prepared for the pin and the block.

Pin: SAE 3135

Block: AISIC 1137

(2) Wear Test

The following test was performed by using a Falex test machine according to ASTM D2670.

The pin and the block were mounted on the Falex test machine, and 100 mL of lubricating oil composition to be evaluated was introduced to the test vessel, and measured for the pin and block wear amounts (mg) by operating the machine set to a rotation number of 290 r/min, an oil temperature of 25° C., and a load of 1,334 N, for 1 hour.

The total amount of the wear amounts of the pin and the block in the test is preferably 10.0 mg or less from the standpoint of the achievement of the lubrication capability capable of sufficiently securing the lifetime of the machine for a prolonged period of time even under the severe conditions in recent years.

[Oxidation Stability]

In an autoclave vessel (capacity: 200 mL), Fe, Cu, and Al were placed as a catalyst, a mixture of 20 g of each of the lubricating oil compositions obtained in the examples and 20 g of the refrigerant (R1234yf) was placed, and 2,000 ppm by mass of water was placed, which were retained at 175° C. for 14 days and then evaluated for the acid value (mgKOH/g).

The acid value was measured according to JIS K2501 by the indicator luminosity titration method (see Appendix 1 of the JIS document).

The acid value in the test is preferably 0.5 mgKOH/g or less from the standpoint of the achievement of the sufficient oxidation lifetime even under the severe conditions in recent years.

TABLE 1

|  |  |  | \multicolumn{9}{c}{Example} | \multicolumn{3}{c}{Comparative Example} |
|---|---|---|---|---|---|---|---|---|---|---|---|---|---|---|
|  |  |  | 1 | 2 | 3 | 4 | 5 | 6 | 7 | 8 | 9 | 1 | 2 | 3 |
| Blending composition (% by mass) | Base oil (A) | PAG | 98.6 | 98.0 | 99.0 | 98.8 |  | 98.0 | 98.7 | 98.3 | 98.3 | 98.6 | 98.8 |  |
|  |  | PVE |  |  |  |  | 98.8 |  |  |  |  |  |  | 98.6 |
|  | Component (B) | TPAP | 0.9 | 1.5 |  |  |  |  |  |  |  |  |  |  |
|  |  | TPPO |  |  | 0.5 | 0.7 | 0.7 | 1.5 | 0.7 | 0.7 | 0.7 |  |  |  |
|  | Component (C) | Tetraphenyl-m-phenylene bis-phosphate |  |  |  |  |  |  | 0.1 | 0.5 |  |  |  |  |
|  |  | Trisnonylphenyl phosphite |  |  |  |  |  |  |  |  | 0.5 |  |  |  |
|  | Comparative extreme pressure agent | TCP |  |  |  |  |  |  |  |  |  | 0.9 |  | 0.9 |
|  |  | TPP |  |  |  |  |  |  |  |  |  |  | 0.7 |  |
|  | Antioxidant | DBPC | 0.5 | 0.5 | 0.5 | 0.5 | 0.5 | 0.5 | 0.5 | 0.5 | 0.5 | 0.5 | 0.5 | 0.5 |
|  | Total |  | 100.0 | 100.0 | 100.0 | 100.0 | 100.0 | 100.0 | 100.0 | 100.0 | 100.0 | 100.0 | 100.0 | 100.0 |
| Phosphorus atom content | derived from component (B) (ppm by mass) |  | 790 | 1310 | 550 | 790 | 790 | 1660 | 790 | 790 | 790 | 0 | 0 | 0 |
|  | derived from component (C) (ppm by mass) |  | 0 | 0 | 0 | 0 | 0 | 0 | 100 | 530 | 180 | 0 | 0 | 0 |
|  | derived from TCP or TPP (ppm by mass) |  | 0 | 0 | 0 | 0 | 0 | 0 | 0 | 0 | 0 | 790 | 790 | 790 |
|  | Total amount ppm by mass) |  | 790 | 1310 | 550 | 790 | 790 | 1660 | 890 | 1320 | 970 | 790 | 790 | 790 |
| Evaluation result | Falex wear test | Wear amount: pin (mg) | 8.0 | 9.8 | 8.2 | 8.4 | 9.2 | 8.3 | 8.0 | 4.2 | 6.7 | 11.7 | 33.0 | 10.7 |
|  |  | Wear amount: block (mg) | 0.2 | 0.0 | 0.0 | 0.0 | 0.6 | 0.0 | 0.0 | 0.0 | 0.0 | 0.0 | 0.5 | 0.1 |
|  |  | Wear amount: total (mg) | 8.2 | 9.8 | 8.2 | 8.4 | 9.8 | 8.3 | 8.0 | 4.2 | 6.7 | 11.7 | 33.5 | 10.8 |
|  | Oxidation stability | Acid value after test (mgKOH/g) | 0.02 | 0.03 | 0.00 | 0.00 | 0.00 | 0.00 | 0.02 | 0.30 | 0.10 | 1.52 | 0.02 | 1.65 |

As shown in Table 1, the lubricating oil compositions of Examples 1 to 9 using the component (B) each resulted in a wear amount (total amount) of lower than 10.0 mg and an acid value after the test not exceeding 0.5 mgKOH/g, i.e., the increase of the acid value was suppressed low. In particular, the lubricating oil compositions of Examples 7 to 9 using the component (B) and the component (C) in combination each resulted in a significantly small wear amount.

On the other hand, the lubricating oil compositions of Comparative Examples 1 and 3 using TCP each resulted in a large wear amount and a large acid value after the test. The lubricating oil composition of Comparative Example 2 using TPP, i.e., a phosphine compound having no oxygen atom, resulted in a large wear amount.

It is understood from the results that the lubricating oil composition of the present invention is excellent in the wear resistance, and the refrigerator oil composition using the lubricating oil composition of the present invention is excellent in the oxidation stability.

INDUSTRIAL APPLICABILITY

The lubricating oil composition of the present invention is favorably applied to an internal combustion engine oil used in a gasoline engine, a diesel engine, and other internal combustion engines; an automobile gear oil for a gasoline automobile, a hybrid automobile, an electric automobile, and the like; a gear oil, such as an industrial gear oil for a general machine or the like; and a refrigerator oil used with a refrigerant, due to the excellent wear resistance thereof. The lubricating oil composition of the present embodiment is favorable as a refrigerator oil since a high oxidation stability can be obtained particularly in the use with a refrigerant.

The invention claimed is:
1. A refrigerator oil composition comprising a lubricating oil composition and a refrigerant,
wherein the lubricating oil composition comprises a base oil (A) and a phosphine derivative (B) having at least one oxygen atom in a molecule, wherein the base oil (A) comprises at least one selected from the group consisting of a polyalkylene glycol (PAG) and a polyvinyl ether (PVE), wherein the phosphine derivative (B) is a compound represented by the following formula (B-1) or (B-3):

wherein $R^{1b}$ to $R^{3b}$ each independently represent a phenyl group or a naphthyl group substituted with an alkoxy group having 1 to 5 carbon atoms,

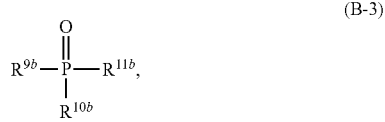

wherein $R^{9b}$ to $R^{11b}$ each independently represent a phenyl group or a naphthyl group, wherein a content of the component (B) in terms of phosphorus atom derived from the component (B) is from 400 to 1,800 ppm by mass based on the total amount of the lubricating oil composition, wherein the refrigerant comprises an unsaturated fluorinated hydrocarbon compound selected from the group consisting of 1,3,3,3-tetrafluoropropene (R1234ze), 2,3,3,3-tetrafluoropropene (R1234yf) or a combination thereof, and wherein a mass ratio of the lubricating oil composition to the refrigerant is from 5/95 to 70/30.

2. The refrigerator oil composition according to claim 1, wherein the component (B) is at least one selected from the group consisting of tris(p-methoxyphenyl)phosphine and triphenylphosphine oxide.

3. The refrigerator oil composition according to claim 1, wherein the lubricating oil composition further comprises at least one phosphorus based compound (C) selected from the group consisting of a phosphite ester based compound and a polyphosphate based compound.

4. The refrigerator oil composition according to claim 3, wherein
the phosphite ester based compound is at least one selected from the group consisting of trisnonylphenyl phosphite and dioleyl hydrogen phosphite, and
the polyphosphate based compound is at least one selected from the group consisting of tetraphenyl-m-phenylene bisphosphate and bisphenol A bis(diphenylphosphate).

5. The refrigerator oil composition according to claim 1, wherein the lubricating oil composition further comprises at least one additive selected from the group consisting of an antioxidant, an oiliness improver, an oxygen scavenger, a copper deactivator, a rust inhibitor, an anti-foaming agent, and a viscosity index improver.

6. The refrigerator oil composition according to claim 1, wherein the lubricating oil composition has a water content of 800 ppm by mass or less.

7. The refrigerator oil composition according to claim 1, wherein the refrigerant further comprises at least one selected from the group consisting of an a saturated fluorinated hydrocarbon compound, a hydrocarbon, carbon dioxide, and ammonia.

8. The refrigerator oil composition according to claim 1, wherein the refrigerator oil composition is applied to an air conditioner, a refrigeration chamber, an automatic vending machine, a showcase, a refrigeration system, a hot water supply machine, or a warming system.

* * * * *